United States Patent
Xu et al.

(10) Patent No.: US 11,867,434 B1
(45) Date of Patent: Jan. 9, 2024

(54) RADIATIVE COOLING FILM AND PRODUCT THEREOF

(71) Applicants: NINGBO RADI-COOL ADVANCED ENERGY TECHNOLOGIES CO., LTD., Ningbo (CN); NINGBO RUILING ADVANCED ENERGY MATERIALS INSTITUTE CO., LTD., Ningbo (CN)

(72) Inventors: Shaoyu Xu, Ningbo (CN); Ronggui Yang, Ningbo (CN); Song Zhong, Ningbo (CN); Minghui Wang, Ningbo (CN); Zhengjie Yin, Ningbo (CN); Huihui Yang, Ningbo (CN); Zhaolu Xia, Ningbo (CN)

(73) Assignees: NINGBO RADI-COOL ADVANCED ENERGY TECHNOLOGIES CO., LTD., Ningbo (CN); NINGBO RUILING ADVANCED ENERGY MATERIALS INSTITUTE CO., LTD., Ningbo (CN)

( * ) Notice: Subject to any disclaimer, the term of this patent is extended or adjusted under 35 U.S.C. 154(b) by 0 days.

(21) Appl. No.: 17/280,878

(22) PCT Filed: Mar. 1, 2021

(86) PCT No.: PCT/CN2021/078472
§ 371 (c)(1),
(2) Date: Mar. 27, 2021

(87) PCT Pub. No.: WO2022/165886
PCT Pub. Date: Aug. 11, 2022

(30) Foreign Application Priority Data

Feb. 4, 2021 (CN) .......................... 202110154142.3

(51) Int. Cl.
*F25D 17/04* (2006.01)
*F25B 23/00* (2006.01)
(Continued)

(52) U.S. Cl.
CPC .............. *F25B 23/003* (2013.01); *B32B 3/30* (2013.01); *B32B 7/023* (2019.01); *B32B 7/028* (2019.01);
(Continued)

(58) Field of Classification Search
CPC ....... F25B 23/003; B32B 7/023; B32B 7/028; B32B 3/30; B32B 15/08;
(Continued)

(56) References Cited

U.S. PATENT DOCUMENTS 4,586,350 A * 5/1986 Berdahl ................ F25B 23/003
359/360
2007/0139780 A1 6/2007 Suzuki et al.
(Continued)

FOREIGN PATENT DOCUMENTS

CN 110128688 A 8/2019
CN 110274326 A 9/2019
(Continued)

OTHER PUBLICATIONS

International Search Report of PCT/CN2021/078472.
The extended European search report of 21165985.9.

*Primary Examiner* — Davis D Hwu

(57) ABSTRACT

A radiative cooling film and a product thereof are provided. The radiative cooling film includes a carrier layer, a reflective layer and an emissive layer stacked together. A light shines on the radiative cooling film from the emissive layer. The emissive layer includes a polymer containing a C—F bond. The carrier layer includes a polymer containing at least one of a C—C bond and a C—O bond. After disposing (Continued)

at 120 degrees centigrade for 30 minutes, a transverse direction heat-shrinkage rate of the carrier layer is less than or equal to 2%, and a machine direction heat-shrinkage rate of the carrier layer is less than or equal to 3%. A thickness of the radiative cooling film is in a range of 50 m to 170 μm, and a thickness of the emissive layer accounts for 20% to 90% of the thickness of the radiative cooling film.

16 Claims, 3 Drawing Sheets

(51) Int. Cl.
*B32B 15/08* (2006.01)
*B32B 3/30* (2006.01)
*B32B 7/028* (2019.01)
*B32B 7/023* (2019.01)

(52) U.S. Cl.
CPC .......... *B32B 15/08* (2013.01); *B32B 2250/02* (2013.01); *B32B 2255/10* (2013.01); *B32B 2307/308* (2013.01); *B32B 2307/416* (2013.01); *B32B 2307/7376* (2023.05)

(58) Field of Classification Search
CPC ........ B32B 2307/7376; B32B 2250/02; B32B 2250/10; B32B 2307/308; B32B 2307/416
USPC .......................................................... 62/407
See application file for complete search history.

(56) References Cited

U.S. PATENT DOCUMENTS

| | | | |
|---|---|---|---|
| 2018/0081097 | A1 | 3/2018 | Konuma et al. |
| 2019/0256717 | A1* | 8/2019 | Van Overmeere ... C09D 129/14 |

FOREIGN PATENT DOCUMENTS

| | | |
|---|---|---|
| CN | 111114031 A | 5/2020 |
| CN | 210894760 U | 6/2020 |
| CN | 111806020 A | 10/2020 |
| CN | 211683857 U | 10/2020 |
| EP | 3744517 A1 | 12/2020 |
| WO | WO2016194560 A1 | 12/2016 |
| WO | WO2018207563 A1 | 11/2018 |

\* cited by examiner

RADIATIVE COOLING FILM AND PRODUCT THEREOF

CROSS REFERENCE TO RELATED APPLICATIONS

This application is a 371 of international PCT patent application PCT/CN2021/078472 filed on Mar. 1, 2021, which claims all benefits accruing under 35 U.S.C. § 119 from China Patent Application No. 202110154142.3, and titled "RADIATIVE COOLING FILM AND PRODUCT THEREOF", filed on Feb. 4, 2021, in the China National Intellectual Property Administration, the content of which is hereby incorporated by reference.

TECHNICAL FIELD

The present disclosure relates to the field of new material and energy saving, and in particular, to a radiative cooling film and a production thereof.

BACKGROUND

In the energy saving field, a radiative cooling film can transport heat at a surface of an object to an outer space in a form of infrared ray in a waveband of atmospheric window (i.e. 8 μm-13 μm), so as to reduce the temperature of the object without consuming energy. FIG. 1 shows a conventional radiative cooling film, including a first substrate layer 11 as a substrate, a first reflective layer 12 and a first emissive coating layer 13. The first emissive coating layer 13 is made of a fluorine-containing resin, and a plurality of first radiative cooling particles 14 is further dispersed in the first emissive coating layer 13. In the radiative cooling film, the first radiative cooling particles 14 are added in the first emissive coating layer 13. In one aspect, the first radiative cooling particle 14 can reduce the mechanical property of the radiative cooling film. In another aspect, the first radiative cooling particle 14 can damage the orderliness of molecular chains of the fluorine-containing resin, so that permeability of water and oxygen of the radiative cooling film may be increased, thereby reducing the weather resistance of the radiative cooling film.

In FIG. 2, in order to solve defects of the radiative cooling particles added in the fluorine-containing film, another conventional radiative cooling film includes a second substrate layer 21, a second reflective layer 22, a second emissive layer 23 and a fluorine-containing film 24 stacked in that order. The second emissive layer 23 can include a colloid and a plurality of second radiative cooling particles 25 disposed in the colloid. In the radiative cooling film, the second radiative cooling particles 25 are added in the colloid instead of in the fluorine-containing film 24, that is, the second emissive layer 23 can be an adhesive layer consisted of the colloid and the second radiative cooling particles. The fluorine-containing film 24 can be configured for improving the weather resistance of the radiative cooling film. However, adding the second radiative cooling particles 25 into the colloid can also lead to an increase of the permeability of water and oxygen of the colloid, resulting in the weather resistance of the radiative cooling film being reduced. Moreover, the adhesive property of the colloid may be reduced by adding the second radiative cooling particles 25 into the colloid, and further reducing integrality performance of the radiative cooling film. At the same time, the internal structure of the colloid may be damaged, resulting in reduction of the cohesion of the colloid and mechanical property of the radiative cooling film.

SUMMARY

In order to solve the above problems, it is necessary to provide a radiative cooling film having excellent cooling effect, weather resistance and mechanical property, and a product thereof.

A radiative cooling film, including a carrier layer, a reflective layer and an emissive layer, wherein the carrier layer, the reflective layer and the emissive layer are stacked up. The emissive layer is defined as a light-incident side of the radiative cooling film. The emissive layer includes a polymer containing a C—F bond, and the carrier layer includes a polymer containing at least one of a C—C bond and a C—O bond. After being disposed at 120 degrees centigrade for 30 minutes, a transverse direction heat-shrinkage rate of the carrier layer is less than or equal to 2%, and a machine direction heat-shrinkage rate of the carrier layer is less than or equal to 3%. A thickness of the radiative cooling film is in a range of 50 μm to 170 μm, and a thickness of the emissive layer accounts for 20% to 90% of the thickness of the radiative cooling film.

In some embodiments, when the reflective layer is disposed between the carrier layer and the emissive layer, the thickness of the radiative cooling film is in a range of 55 μm to 170 μm.

In some embodiments, a ratio of the thickness of the emissive layer to the thickness of the carrier layer is in a range of 1:2 to 8:1.

In some embodiments, the thickness of the emissive layer in in a range of 25 μm to 120 μm.

In some embodiments, when the carrier layer is disposed between the reflective layer and the emissive layer, the thickness of the radiative cooling film is in a range of 50 μm to 125 μm.

In some embodiments, the ratio of the thickness of the emissive layer to the thickness of the carrier layer is in a range of 3:10 to 22:3.

In some embodiments, the thickness of the emissive layer is in a range of 15 μm to 110 μm.

In some embodiments, the emissive layer includes fluorine-containing resin. In some embodiments, the carrier layer includes at least one of polyester, polyurethane, polyamide and polycarbonate. In some embodiments, the reflective layer includes at least one of metal and alloy.

In some embodiments, a surface energy of a surface of the carrier layer contacted with the reflective layer is larger than or equal to 40 mN/m.

In some embodiments, a polymer coating layer is disposed between the carrier layer and the reflective layer. A surface energy of the polymer coating layer is larger than or equal to 40 mN/m, and a thickness of the polymer coating layer is in a range of 3 nm to 200 nm.

In some embodiments, an absolute value of a difference between a refractivity of the carrier layer and a refractivity of the polymer coating layer is larger than or equal to 0.05.

In some embodiments, a light-incident surface of the emissive layer is provided with an embossing structure.

A product including the radiative cooling film. The product includes a substrate and the radiative cooling film disposed on the substrate via an adhesive layer. The adhesive layer is away from the emissive layer of the radiative cooling film.

In some embodiments, the substrate includes at least one of metal substrate, ceramic substrate, semi-conductor substrate, plastic substrate, glass substrate, rubber substrate, asphalt substrate, cement substrate and fabric substrate.

In some embodiments, the product is a waterproof radiative cooling roll material, the substrate is selected from a petroleum asphalt paper-based felt, a petroleum asphalt fiberglass-based roll material, an aluminum-surface roll material, a waterproof SBS modified asphalt roll material, a waterproof APP modified asphalt roll material, an ethylene-propylene-diene monomer roll material, a polyvinyl chloride roll material, a chlorinated polyethylene roll material, a mixed rubber roll material, and a waterproof TPO roll material.

In some embodiments, the product is a radiative cooling metal plate, wherein the substrate is selected from an aluminum alloy plate, a galvanized metal plate, a tinned metal plate, a clad steel plate and a colored steel plate.

C—F bond has very strong absorptivity in a waveband of atmospheric window in a range of 8 μm to 13 μm, and has a very strong absorption peak in a waveband in a range of 8 μm-10 μm. Similarly, C—C bond and C—O bond further have relatively strong absorptivity in a waveband of atmospheric window in a range of 8 μm to 13 μm, and especially have a very strong absorption peak in a waveband in a range of 8 μm-9.5 μm. Therefore, a polymer containing a C—F bond has excellent spectral selectivity, and a polymer containing at least one of C—C bond and C—O bond has relatively good spectral selectivity. At the same time, due to large electronegativity of fluorine atom, the C—F bond has high bond energy as high as 500 kJ/mol. However, in the waveband of sunlight, light with a wavelength in a range of 280 nm to 780 nm can damage an organic matter, but energy of the light cannot damage the C—F bond. Moreover, due to relatively low polarizability of the fluorine atom, the polymer containing C—F bond can have high thermal stability and chemical inertness, so that the polymer containing C—F bond can have excellent weather resistance.

Therefore, in the radiative cooling film of the present disclosure, the emissive layer is made of the polymer containing C—F bond, and the carrier layer is made of polymer containing at least one of C—C bond and C—O bond, and such two kinds of polymers can work together. At the same time, the emissive layer is defined as a light-incident side of the radiative cooling film. By controlling the thickness of the radiative cooling film, a number of C—F bonds, C—C bonds and/or C—O bonds in unit area of the radiative cooling film can be optimized, and the heat absorption of light having a wavelength in the range of sunlight can be controlled. Therefore, the radiative cooling film can have an excellent atmospheric window emissivity without adding radiative cooling particles, so as to avoid adverse effects on mechanical properties and weather resistance of the radiative cooling film caused by adding the radiative cooling particles, so that the radiative cooling film can have excellent mechanical properties and weather resistance.

In the figures, 11 represents a first substrate layer; 12 represents a first reflective layer; 13 represents a first emissive coating layer; 14 represents a first radiative cooling particle; 21 represents a second substrate layer; 22 represents a second reflective layer; 23 represents a second emissive layer; 24 represents fluorine-containing film; 25 represents a second radiative cooling particle; 31 represents a carrier layer; 32 represents a reflective layer; 33 represents an emissive layer; 34 represents an adhesive layer; 35 represents a polymer coating layer; 36 represents embossing structures.

DETAILED DESCRIPTION

The radiative cooling layer and a product thereof provided in the present disclosure will be further described herein after.

Figure 1:
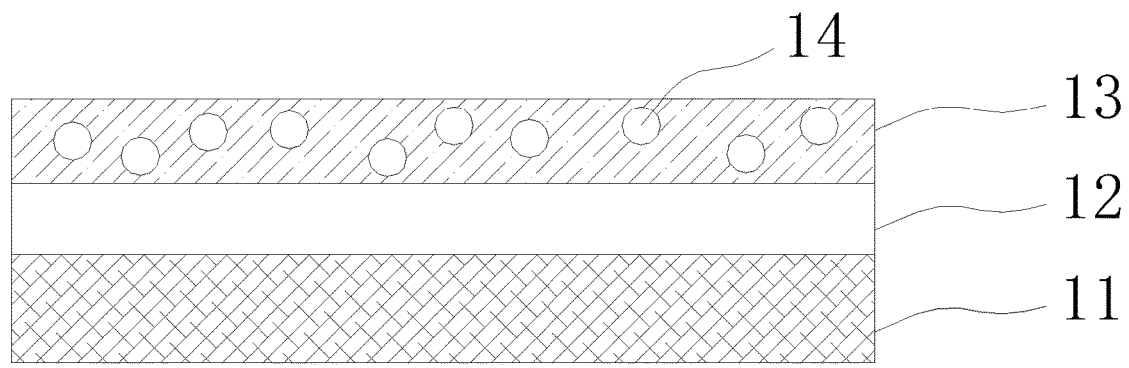
FIG. 1 is a schematic diagram of one conventional radiative cooling film.
Figure 2:
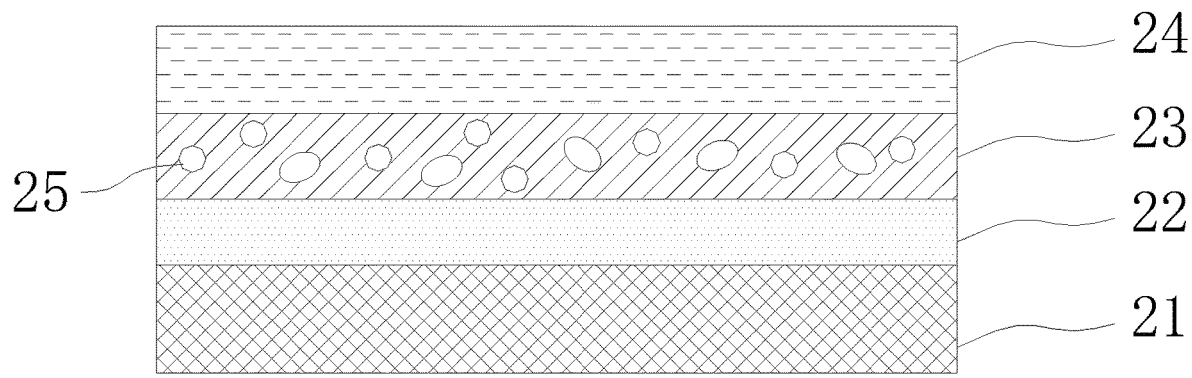
FIG. 2 is a schematic diagram of another conventional radiative cooling film.
Figure 3:
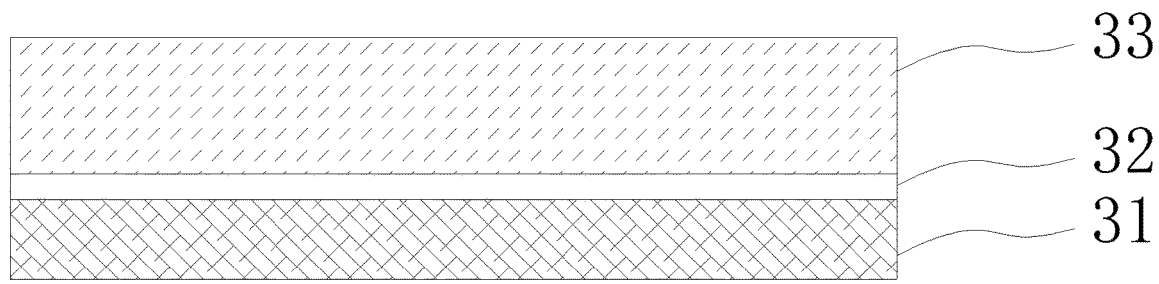
FIG. 3 is a schematic diagram of one radiative cooling film in a first execution mode of the present disclosure.

FIG. 3 shows a radiative cooling film in the first execution mode of the present disclosure. The radiative cooling film can include a carrier layer 31, a reflective layer 32 and an emissive layer 33 stacked together.

In some embodiments, a material of the emissive layer 33 can include a polymer containing C—F bond. The C—F bond can have very strong absorptivity in a waveband of atmospheric window in a range of 8 μm to 13 μm, and a very strong absorption peak in a waveband in a range of 8 μm to 13 μm. Therefore, the polymer containing C—F bond can have excellent spectral selectivity. When the polymer containing C—F bond is made into the emissive layer 33, the emissive layer 33 can have excellent atmospheric window emissivity. At the same time, due to large electronegativity of fluorine atom, the C—F bond can have high bond energy as high as 500 kJ/mol. However, for light having a wavelength in the waveband of sunlight, light damaging an organic matter can have a wavelength in a range of 280 nm to 780 nm, but energy of the light cannot damage the C—F bond. Moreover, due to relatively low polarizability of the fluorine atom, the polymer containing the C—F bond can have high thermal stability and chemical inertness, so that the polymer containing C—F bond can have excellent weather resistance. When the emissive layer 33 is made of the polymer containing the C—F bond, the emissive layer 33 can have excellent weather resistance.

The carrier layer 31 can include a polymer containing at least one of C—C bond and C—O bond. The C—C bond and the C—O bond can further have relatively strong absorptivity in a waveband of atmospheric window in a range of 8 μm to 13 μm, and especially can have a very strong absorption peak in a waveband in a range of 8 μm-9.5 μm. Therefore, the polymer containing at least one of C—C bond and C—O bond can further have a relatively good spectral selectivity. When the carrier layer 31 is made of the polymer containing at least one of C—C bond and C—O bond, the atmospheric window emissivity of the radiative cooling film can be improved.

In the radiative cooling film, the emissivity can conform to a following formula:

$$y = a - b e^{(-x/k)}.$$

In the formula, y can represent the emissivity; a, b and k can represent constants defined by the material; x can represent a thickness of the radiative cooling film, and e can represent a nature exponential. It can be concluded from the formula that along with the increase of the thickness of the emissive layer 33 and the carrier layer 31, the number of C—F bonds, C—C bonds and/or C—O bonds in unit area of the radiative cooling film can increase, and the atmospheric window emissivity of the radiative cooling film can increase. However, increase of the thickness not only can increase a cost of the radiative cooling film, but also can increase heat absorption of the emissive layer 33 and the carrier layer 31 to light in the waveband of the sunlight. When the thickness of the radiative cooling film reaches a limitation, cooling effect of the radiative cooling film may decrease along with the increase of the thickness.

Therefore, in the present disclosure, the radiative cooling film can have a thickness in a range of 50 μm to 170 μm. A thickness of the radiative cooling film is in a range of 50 μm to 170 μm, and a ratio of a thickness of the emissive layer to the thickness of the radiative cooling film is in a range of 20:100 to 90:100. Therefore, by controlling the thickness of the emissive layer and the carrier layer, the number of C—F bonds, C—C bonds and/or C—O bonds in unit area of the radiative cooling film can be optimized. Meanwhile, the heat-absorption of the light having the wavelength in the waveband of the sunlight can be controlled, and a heat absorptivity of the emissive layer 33 and the carrier layer 31 can be less than or equal to 20%. Therefore, the radiative cooling film can have an excellent atmospheric window emissivity without adding radiative cooling particles, so as to avoid adverse effects on mechanical properties and weather resistance of the radiative cooling film caused by adding the radiative cooling particles, so that the reflective radiative cooling film can have excellent mechanical properties and weather resistance.

In the first execution mode, the reflective layer 32 can be disposed between the carrier layer 31 and the emissive layer 33. When the radiative cooling film is disposed on a substrate, the emissive layer 33 can be the light-incident side of the radiative cooling film, so that the radiative cooling film can have excellent weather resistance.

At this time, when the sunlight reaches the radiative cooling film, the reflective layer 32 can reflect most of the sunlight into the atmosphere, so that the light in the waveband of the sunlight can be blocked and little of the light can enter the substrate. Then, heat inside the substrate can be transformed into infrared ray having a wavelength in a range of 8 μm to 13 μm by the emissive layer 33, and radiated through the atmospheric window in a range of 8 μm to 13 μm. Since the infrared ray in waveband of atmospheric window (8 μm to 13 μm) is little absorbed by the atmosphere, the infrared ray can directly enter the outer space, so as to play a role of radiative cooling, thereby cooling the substrate.

In the first execution mode, since the carrier layer 31 is separated from the emissive layer 33 by the reflective layer 32, the carrier 31 can protect the reflective layer 32, but the effect of the carrier layer 31 for improving the emissivity of the radiative cooling film can be reduced. Therefore, in some embodiments, the thickness of the radiative cooling film can be in a range of 55 μm to 170 μm. In consideration of heat-shrinkage of the radiative cooling film, a ratio of the thickness of the emissive layer 33 to a thickness of the carrier layer 31 can be in a range of 1:2 to 8:1; and in some embodiments, can be in a range of 1:1 to 3.75:1. The ratio of the thickness of the emissive layer 33 to the thickness of the reflective layer 32 can be in a range of 50:1 to 12000:1; and in some embodiments, can be in a range of 80:1 to 4000:1. The thickness of the emissive layer 33 can be in a range of 25 μm to 120 μm; and in some embodiments, can be in a range of 40 μm to 75 μm. Therefore, by controlling the thickness of the emissive layer and the carrier layer, the number of C—F bonds, C—C bonds and/or C—O bonds in unit area of the radiative cooling film can be optimized. Meanwhile, heat absorption of the radiative cooling film to the light in waveband of the sunlight can be controlled, so that the heat absorptivity of the emissive layer 33 and the carrier layer 31 can further be less than or equal to 15%; and, in some embodiments, can be less than or equal to 10%.

In the radiative cooling film of the first execution mode, the reflective layer 32 can include at least one of metal and alloy. In some embodiments, the reflective layer 32 can include at least one of silver, silver alloy, aluminum, aluminum alloy, titanium, and titanium alloy. In some embodiments, the reflective layer 32 can include a plurality of reflective sub-layers, so as to reduce the internal stress of the reflective layer 32. In some embodiments, the reflective layer 32 can include stacked-up silver reflective layer and aluminum reflective layer; in other embodiments, the further include stacked-up titanium reflective layers. At the same time, when materials of the sub reflective layers are different, the plurality of reflective sub-layers can coordinate with each other, so as to make up the technology defects and effect defects of the independent reflective sub-layers, so that the reflectivity of the reflective layer 32 in the full waveband of the sunlight can be improved, thereby improving the reflectivity of the radiative cooling film. Meanwhile, damage of ultraviolet light to the radiative cooling film can be reduces, so that a service life of the radiative cooling film can be prolonged. Therefore, in this execution mode, by optimizing the material, the structure and the thickness of the carrier layer and the emissive layer, an emissivity of the radiative cooling film in the atmospheric window waveband can reach up to 85%; in some embodiments, the emissivity can further reach up to 90%; in other embodiments, the emissivity can further reach up to 95%. The reflectivity of the radiative cooling film to the full waveband of the sunlight can reach up to 82%; in some embodiment, the reflectivity can further reach up to 87%; and in other embodiments, the reflectivity can further reach up to 92%. The radiative cooling film can have excellent cooling effect.

In consideration of mechanical properties (such as tensile strength, etc.) of the radiative cooling film, the polymer containing at least one of C—C bond and C—O bond can be selected from at least one of polyester, polyurethane, polyamide and polycarbonate in some embodiments. In some embodiments, the polyester can include at least one of polyethylene terephthalate (PET), polybutylene terephthalate (PBT) and poly(ethylene terephthalate-1,4-cyclohexadiene dimethylene terephthalate) (PETG).

Due to high surface energy of the reflective layer 32 made of metal and alloy, the reflective layer 32 can be directly adhered to a surface of the carrier layer 31. Alternatively, the reflective layer 32 can be deposited on the surface of the carrier layer 31 by methods of sputtering, vapor deposition, and the like.

In order to ensure the smoothness of the reflective layer and the cooling effect and service life of the radiative cooling film, after being disposed at 120 degrees centigrade for 30 minutes, a transverse direction (TD) heat-shrinkage rate of the carrier layer 31 can be less than or equal to 2%, and a machine direction (MD) heat-shrinkage rate of the carrier layer can be less than or equal to 3%.

A fluorine-containing resin can include C—F bond, and can be easy to obtain. In some embodiments, the emissive layer 33 can be the fluorine-containing resin, which can be at least one selected from ethylene-tetrafluoroethylene copolymer (ETFE), polyvinylidene fluoride (PVDF), polyvinyl formal (PVF), polychlorotrifluoroethylene (PCTFE), fluoroolefin-vinyl ether copolymer (FEVE), polytetrafluoroethylene (PTFE), ethylene chlorotrifluoroethylene copolymer (ECTFE), fluoroethylene propylene copolymer (FEP) and fusible polytetrafluoroethylene (PFA). In some embodiments, the fluorine-containing resin can include at least one of ethylene-tetrafluoroethylene copolymer (ETFE), polyvinylidene fluoride (PVDF), polyvinyl formal (PVF), fluoroolefin-vinyl ether copolymer (FEVE), polytetrafluoroethylene (PTFE) and fluoroethylene propylene copolymer (FEP).

The fluorine-containing resin can have a relatively low surface energy. Thus, the emissive layer 33 can be directly made by coating a painting of fluorine-containing resin on a surface of the reflective layer 32. The painting of the fluorine-containing resin can be water-based or oil-based.

Figure 4:
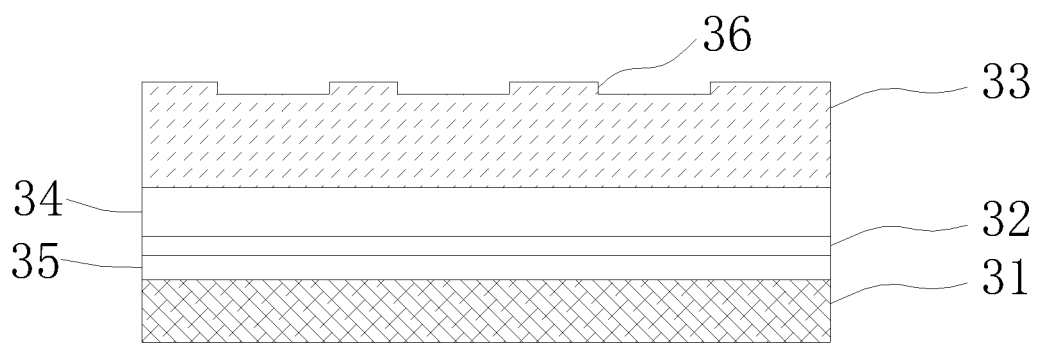
FIG. 4 is a schematic diagram of one radiative cooling film in a second execution mode of the present disclosure.

FIG. 4 is a schematic diagram of one radiative cooling film in the second execution mode of the present disclosure, wherein the emissive layer 33 is a fluorine-containing film. In the radiative cooling film, the fluorine-containing resin film can be adhered to the reflective layer 32 via an adhesive layer 34. The adhesive layer 34 can include at least one of the polyurethane glue and acrylic acid glue having great weather resistance. A thickness of the adhesive layer 34 can be in a range of 0.5 µm to 20 µm.

Moreover, the material of the carrier layer 31 can be selected from polyester, polyurethane, polyamide and polycarbonate, and a surface energy of them are low. Before depositing or pasting the reflective layer 32, the surface of the carrier layer 31 can be treated by plasma method, corona method, and the like, so that the surface energy of the carrier layer 31 can be larger than 40 mN/m. In some embodiments, the surface energy of the carrier layer 31 can be improved to larger than 42 mN/m; in other embodiments, the surface energy of the carrier layer 31 can be improved to larger than 45 mN/m; in other embodiments, the surface energy of the carrier layer 31 can be improved to larger than 50 mN/m; and in other embodiments, the surface energy of the carrier layer 31 can be improved to larger than 55 mN/m. Alternatively, a polymer coating layer 35 can be disposed on the carrier layer 31, a surface energy of the polymer coating layer 35 can be larger than 40 mN/m. In some embodiments, the surface energy of the polymer coating layer 35 can be than 42 mN/m; in other embodiments, the surface energy of the polymer coating layer 35 can be larger than 45 mN/m; in other embodiments, the surface energy of the polymer coating layer 35 can be larger than 50 mN/m; and in other embodiments, the surface energy of the polymer coating layer 35 can be larger than 55 mN/m. Therefore, an adhesive force of the carrier layer 31 and the reflective layer 32 can be largely improved, so that the peel strength of the entire radiative cooling film can be improved.

When the radiative cooling film is provided with the polymer coating layer 35, a thickness of the polymer coating layer can be in a range of 3 nm to 200 nm. An absolute value of a difference between a refractivity of the carrier layer 31 and a refractivity of the polymer coating layer 35 can be larger than or equal to 0.05, so as to facilitate improving the reflectivity of the radiative cooling film.

In some embodiments, a material of the polymer coating layer 35 can include at least one of epoxy acrylic polymer, polyurethane acrylate and polyester acrylate.

Referring to FIG. 4, in a radiative cooling film of the present disclosure, the light-incident surface of the emissive layer 33 can be provided with embossing structures 36. The embossing structure can include at least one of square-shaped structure, circle-shaped structure, rhombus-shaped structure and twill-shaped structure. The embossing structure can have a depth in a range of 0.5 µm to 2.5 µm. A gloss unit of the radiative cooling film can be reduced by the embossing structure 36, so as to reduce light of specular reflection, so that light pollution caused by the radiative cooling film of the present disclosure can be reduced. Therefore, the radiative cooling film can be used in situations having special requirements to light pollutions, such as airport and the like.

Figure 5:
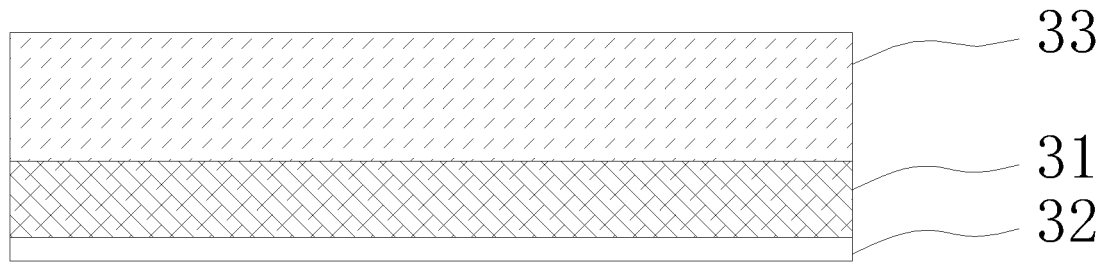
FIG. 5 is a schematic diagram of one radiative cooling film in a third execution mode of the present disclosure.

FIG. 5 is a radiative cooling film in the third execution mode of the present disclosure. In the present execution mode, the carrier layer 31 can be disposed between the reflective layer 32 and the emissive layer 33. At this time, when the sunlight reaches the radiative cooling film, the reflective layer 32 can reflect most of the sunlight into the atmosphere, so that the light in the waveband of the sunlight can be blocked and little of the light can enter the substrate. Then, heat inside the substrate can be transformed into infrared ray having a wavelength in a range of 8 µm to 13 µm by the emissive layer 33, and radiated through the atmospheric window in a range of 8 µm to 13 µm. Since the infrared ray in waveband of atmospheric window (8 µm to 13 µm) is little absorbed by the atmosphere, the infrared ray can directly enter the cold source of outer space, so as to play a role of radiative cooling, thereby cooling the substrate.

In the present execution mode, the carrier layer 31 can be disposed between the emissive layer 33 and the reflective layer 32, so that the carrier layer 31 can better facilitate radiation of the emissive layer 33. Therefore, in some embodiments, the thickness of the radiative cooling film can further be in a range of 50 µm to 125 µm. At the same time, in consideration of heat-shrinkage of the radiative cooling film, the ratio of the thickness of the emissive layer 33 to a thickness of the carrier layer 31 can be in a range of 3:10 to 22:3; and in some embodiments, can be in a range of 1:5 to 20:3. The ratio of the thickness of the emissive layer 33 to the thickness of the reflective layer 32 can be in a range of 30:1 to 110000:1; and in some embodiments, can be in a range of 25:1 to 100000:1. The thickness of the emissive layer 33 can be in a range of 15 µm to 110 µm; and in some embodiments, can be in a range of 40 µm to 75 µm. Therefore, by controlling the thickness of the emissive layer 33 and the carrier layer 31, the number of C—F bonds, C—C bonds and/or C—O bonds in unit area of the radiative cooling film can be optimized. Meanwhile, heat absorption of the radiative cooling film to the light in waveband of the sunlight can be controlled, so that the heat absorptivity of the emissive layer 33 and the carrier layer 31 can further be less than or equal to 15%; and, in some embodiments, can be less than or equal to 10%.

Therefore, in this execution mode, by optimizing the material, the structure and the thickness of the carrier layer and the emissive layer, the emissivity of the radiative cooling film in the atmospheric window waveband can reach 87%; in some embodiments, the emissivity can further reach up to 92%; in other embodiments, the emissivity can further reach up to 97%. The reflectivity of the radiative cooling film to the full waveband of the sunlight can reach up to 80%; in some embodiment, the reflectivity can further reach up to 85%; and in other embodiments, the reflectivity can further reach up to 90%. The radiative cooling film can have excellent cooling effect.

It should be understood that in the present execution mode, the reflective layer 32 can be directly adhered to the surface of the carrier layer 31; alternatively, the reflective layer 32 can be deposited on the surface of the carrier layer 31 by methods of sputtering, vapor deposition, and the like. Before depositing or pasting the reflective layer 32, the surface of the carrier layer 31 can be treated by plasma method, corona method, and the like; alternatively, the polymer coating layer 35 can be disposed on the carrier layer 31. Therefore, the adhesive force of the carrier layer 31 and the reflective layer 32 can be largely improved, so that the peel strength of the entire radiative cooling film can be improved.

Furthermore, the emissive layer 33 can be directly made by coating a painting of fluorine-containing resin on a surface of the reflective layer 32. The painting of the fluorine-containing resin can be water-based or oil-based. Alternately, when the emissive layer 33 is the fluorine-containing film, the fluorine-containing film can be adhered to the carrier layer 31 via the adhesive layer 34.

Therefore, by optimizing the material, the structure and the thicknesses of the radiative cooling film, the radiative cooling film can have an excellent atmospheric window emissivity without adding radiative cooling particles, so as to avoid adverse effects on mechanical properties and weather resistance of the radiative cooling film caused by adding the radiative cooling particles, so that the radiative cooling film can have more excellent mechanical properties and weather resistance, and excellent cooling effect.

The present disclosure further provide a use of the radiative cooling film, wherein the radiative cooling film can be disposed on a surface of a substrate and be configured for reflecting the sunlight and emitting the heat in a form of infrared ray through the atmospheric window.

In some embodiments, the substrate can include at least one of metal substrate, ceramic substrate, semi-conductor substrate, plastic substrate, glass substrate, rubber substrate, asphalt substrate, cement substrate and fabric substrate.

The present disclosure further provide a product including the radiative cooling film, which includes the substrate and the radiative cooling film disposed on the substrate. A surface of the radiative cooling film away from the emissive layer 33 can be connected to the substrate via an adhesive layer, and the surface away from the emissive layer 33 can be the light-incident side.

In some embodiments, the adhesive layer can include at least one of acrylic adhesive, polyurethane pressure sensitive adhesive, hot melt adhesive, hot melt adhesive film and butyl adhesive. The thickness of the adhesive layer can be in a range of 20 μm to 1500 μm. Furthermore, the thickness of the adhesive layer can be in a range of 25 μm to 150 μm. If the adhesive layer is too thick, the absorptivity of the adhesive layer to the sunlight will increase, so that the cooling effect of the radiative cooling film can be affected. If the adhesive layer is too thin, the adhesive property of the adhesive layer will decrease, so that the service life of the radiative cooling film will be affected.

In some embodiments, the substrate can include at least one of metal substrate, ceramic substrate, semi-conductor substrate, plastic substrate, glass substrate, rubber substrate, asphalt substrate, cement substrate and fabric substrate.

In some embodiments, the product can be a waterproof radiative cooling roll material. The substrate can be selected from a petroleum asphalt paper-based felt, a petroleum asphalt fiberglass-based roll material, an aluminum-surface roll material, a waterproof SBS modified asphalt roll material, a waterproof APP modified asphalt roll material, an ethylene-propylene-diene monomer roll material, a polyvinyl chloride roll material, a chlorinated polyethylene roll material, a mixed rubber roll material, and a waterproof TPO roll material.

In some embodiments, the product can be a radiative cooling metal plate, wherein the substrate can be selected from an aluminum alloy plate, a galvanized metal plate, a tinned metal plate, a clad steel plate and a colored steel plate.

Therefore, the radiative cooling film of the present disclosure can be used as an outer surface of a building envelope, such as grain depots, large public buildings (such as high-speed rail stations, airports, exhibition halls, museums), petrochemical storage tanks, power cabinets, communication cabinets and the like. The radiative cooling film can reflect the sunlight and emit the heat in a form of infrared ray through the atmospheric window, so that the building envelope can reduce temperature without energy consumption.

The radiative cooling film of the present disclosure and the product thereof will be further described in details hereinafter.

Embodiment 1

A polyethylene terephthalate film having a thickness of 30 μm was used as the carrier layer. After being disposed at 120 degrees centigrade for 30 minutes, a transverse direction heat-shrinkage rate of the carrier layer was 1.2%, and a machine direction heat-shrinkage rate of the carrier layer was 1.4%. A silver reflective layer having a thickness of 100 nm was obtained on a surface of the carrier layer by magnetron sputtering method. Then polytetrafluoroethylene resin was coated on the other surface of the carrier layer away from the silver reflective layer, and solidified to obtain an emissive layer having a thickness of 50 μm, so that a radiative cooling film was obtained.

Embodiment 2

A polyethylene terephthalate film having a thickness of 30 μm was used as the carrier layer. After being disposed at 120 degrees centigrade for 30 minutes, a transverse direction heat-shrinkage rate of the carrier layer was 1.2%, and a machine direction heat-shrinkage rate of the carrier layer was 1.4%. A silver reflective layer having a thickness of 100 nm was obtained on the carrier layer by magnetron sputtering method. Then polytetrafluoroethylene resin was coated on the silver reflective layer, and solidified to obtain an emissive layer having a thickness of 50 μm, so that a radiative cooling film was obtained.

Embodiment 3

The difference between the embodiment 3 and the embodiment 1 was that a polytetrafluoroethylene film having a thickness of 50 μm was adhered to the surface of the carrier layer via a polyurethane layer having a thickness of 10 μm, so as to obtain the radiative cooling film.

Embodiment 4

The difference between the embodiment 4 and the embodiment 3 was that the polytetrafluoroethylene film was subjected to an embossing process, and had square-shaped embossing structures on the surface. A depth of the square-shaped embossing structure was 1 μm, and the embossing structure was located at the light-incident surface of the emissive layer.

Embodiment 5

The difference between embodiment 5 and embodiment 3 was that an epoxy acrylic polymer having a thickness of 50 nm was disposed between the silver reflective layer and the carrier layer. The epoxy acrylic polymer layer had a surface energy of 56 mN/m, and an absolute value of a difference between a refractivity of the carrier layer and a refractivity of the polymer coating layer was 0.06.

Embodiment 6

A polyethylene terephthalate film having a thickness of 15 μm was used as the carrier layer. After being disposed at 120 degrees centigrade for 30 minutes, a transverse direction heat-shrinkage rate of the carrier layer was 1.6%, and a machine direction heat-shrinkage rate of the carrier layer was 1.8%. A surface of the carrier layer was subjected to plasma treatment, so that the surface energy of which reached 42 mN/m. Then, a silver reflective layer having a thickness of 50 nm was obtained on the surface of the carrier layer by magnetron sputtering method. Then polytetrafluoroethylene resin was coated on the surface of the carrier layer away from the silver reflective layer, and solidified to obtain an emissive layer having a thickness of 35 μm. Then the emissive layer was subjected to an embossing process to obtain square-shaped embossing structures having a depth of 0.5 μm on the surface of the emissive layer, so that a radiative cooling film was obtained.

Embodiment 7

A polyethylene terephthalate film having a thickness of 20 μm was used as the carrier layer. After being disposed at 120 degrees centigrade for 30 minutes, a transverse direction heat-shrinkage rate of the carrier layer was 1.5%, and a machine direction heat-shrinkage rate of the carrier layer was 1.6%. A surface of the carrier layer was coated with a polyurethane acrylate polymer coating having a thickness of 10 nm, and the surface energy of which was 42 mN/m, and an absolute value of a difference between a refractivity of the carrier layer and a refractivity of the polymer coating layer was 0.07. Then, a silver reflective layer having a thickness of 60 nm was obtained on the polymer coating layer by magnetron sputtering method. Then polytetrafluoroethylene resin was coated on the surface of the carrier layer away from the silver reflective layer, and solidified to obtain an emissive layer having a thickness of 40 μm. Then the emissive layer was subjected to an embossing process to obtain square-shaped embossing structures having a depth of 0.5 μm on the surface of the emissive layer, so that a radiative cooling film was obtained.

Embodiment 8

A polyethylene terephthalate film having a thickness of 30 μm was used as the carrier layer. After being disposed at 120 degrees centigrade for 30 minutes, a transverse direction heat-shrinkage rate of the carrier layer was 1.2%, and a machine direction heat-shrinkage rate of the carrier layer was 1.4%. A surface of the carrier layer was coated with a polyester acrylate polymer coating having a thickness of 100 nm, and the surface energy of which was 47 mN/m. An absolute value of a difference between a refractivity of the carrier layer and a refractivity of the polymer coating layer was 0.06. Then, a silver reflective layer having a thickness of 50 nm and an aluminum reflective layer having a thickness of 50 nm were obtained on the polymer coating layer by magnetron sputtering method. Then polytetrafluoroethylene resin was coated on the surface of the carrier layer away from the silver reflective layer, and solidified to obtain an emissive layer having a thickness of 15 μm. Then the emissive layer was subjected to an embossing process to obtain square-shaped embossing structures having a depth of 1 μm on the surface of the emissive layer, so that a radiative cooling film was obtained.

Embodiment 9

A polyethylene terephthalate film having a thickness of 50 μm was used as the carrier layer. After being disposed at 120 degrees centigrade for 30 minutes, a transverse direction heat-shrinkage rate of the carrier layer was 0.8%, and a machine direction heat-shrinkage rate of the carrier layer was 1.0%. A surface of the carrier layer was coated with a polyester acrylate polymer coating having a thickness of 20 nm, and the surface energy of which was 47 mN/m. An absolute value of a difference between a refractivity of the carrier layer and a refractivity of the polymer coating layer was 0.06. Then, a silver reflective layer having a thickness of 200 nm was obtained on the polymer coating layer by magnetron sputtering method. Then a polytetrafluoroethylene film having a thickness of 75 μm was adhered to the surface of the carrier layer via a polyurethane layer having a thickness of 5 μm, wherein the polytetrafluoroethylene film was subjected to an embossing process and had embossing structures having a depth of 2 μm on the surface, so that a radiative cooling film was obtained.

Embodiment 10

A polyethylene terephthalate film having a thickness of 35 μm was used as the carrier layer. After being disposed at 120 degrees centigrade for 30 minutes, a transverse direction heat-shrinkage rate of the carrier layer was 1.1%, and a machine direction heat-shrinkage rate of the carrier layer was 1.2%. A surface of the carrier layer was coated with a polyurethane acrylate polymer coating having a thickness of 50 nm, and the surface energy of which was 42 mN/m. An absolute value of a difference between a refractivity of the carrier layer and a refractivity of the polymer coating layer was 0.07. Then, a silver reflective layer having a thickness of 100 nm and an aluminum reflective layer having a thickness of 100 nm were obtained on the polymer coating layer by magnetron sputtering method. Then a polytetrafluoroethylene film having a thickness of 110 μm was adhered to the surface of the carrier layer via a polyurethane layer having a thickness of 5 μm, wherein the polytetrafluoroethylene film was subjected to an embossing process and had embossing structures having a depth of 2.5 μm on the surface, so that a radiative cooling film was obtained.

Comparative Embodiment 1

The difference between comparative embodiment 1 and embodiment 1 was that a composite painting consisted of polytetrafluoroethylene resin and silicon dioxide particles was coated on the surface of the carrier layer away from the silver reflective layer, wherein the mass ratio of the silicon dioxide particle to the composite painting was 1:100, and a particle size of the silicon dioxide particle was 5 μm.

Comparative Embodiment 2

The difference between comparative embodiment 1 and comparative embodiment 2 was that the mass ratio of the silicon dioxide particle to the composite painting was 10:100, and the particle side of the silicon dioxide particle was 5 µm.

Comparative Embodiment 3

The difference between comparative embodiment 3 and embodiment 3 was that the polyurethane layer included the silicon dioxide particle, wherein the mass ratio of the silicon dioxide particle to the polyurethane layer was 1:100, and the particle size of the silicon dioxide particle was 5 µm.

Comparative Embodiment 4

The difference between comparative embodiment 4 and embodiment 3 was that the polyurethane layer included the silicon dioxide particle, wherein the mass ratio of the silicon dioxide particle to the polyurethane layer was 10:100, and the particle size of the silicon dioxide particle was 5 µm.

The radiative cooling film prepared in embodiments 1 to 10 and comparative embodiments 1 to 4 were tested, and the results were shown in Table 1.

A method for testing the emissivity of the radiative cooling film in atmospheric window waveband (8 µm to 13 µm) was shown hereinafter. The emissivity of the radiative cooling film in a waveband in a range of 8 µm to 13 µm was tested by infrared spectroscopy method with a Fourier transform infrared spectrometer, and a test interval was 5 nm. The emissivity in the waveband in the range of 8 µm to 13 µm was the atmospheric window emissivity.

The reflectivity of the radiative cooling film in waveband of the sunlight (300 nm to 2500 nm) was tested according to a method in GB/T 25968-2010 6.2.

The gloss unit of the radiative cooling film was tested according to a method in GB/T 9754-2007, and the result was the gloss unit of 60 degrees.

A method of xenon arc aging test was shown hereinafter. A xenon arc was selected according to GB/T 16422.2-2014. A xenon arc aging test was carried out by a first circulation method in GB/T 16422.2-2014. In the test, the radiative cooling film sample faced to the light source, and the test lasted for 1000 hours.

A method for testing the peel strength of the radiative cooling film was shown hereinafter. Referring to GB/T 25256-2010 (*Optical functional films—Release film—The measurement of peeling force at 180° angle and subsequent adhesion*), three test stripes in the transverse direction and three test stripes in the machine direction were prepared, respectively (one was on the left, another was in the middle and the other was on the right). The test stripe was in a size of 150 mm×25 mm. The peel strength of the test stripe was tested at a test rate of 100 m/min with a scale distance of 100 mm.

A method for testing the elongation at break and the tensile strength was shown hereinafter. Referring to the fifth chapter of GB/T 1040.1-2018. Three test strips having a width of 25 mm and a length of 150 mm (i.e., the II-type test stripe in GB/T 1040.3-2006) was tested at a test rate of 150 mm/min. The test stripe should have smooth edges without any gap. In the test, the test stripe was disposed on a clamp of the tension tester, and a distance between the clamps was 100 mm. The clamp was drawn at a speed of 100 mm/min, and a maximum tension force and an elongation amount at break were tested. The elongation at break was calculated according to Formula (1). The value was rounded to one decimal place.

$$E = \frac{L_1 - L_0}{L_0} \times 100\% \tag{1}$$

In Formula (1), E represents the elongation at break; L1 represents the elongation amount at break of the sample; and L0 represents the initial distance between the clamps.

The method for test the heat-shrinkage rate can be referred to ASTM D1204.

TABLE 1

| | Emissivity in the wavelength of 8 µm to 13 µm (%) | Reflectivity in the wavelength of 300 nm-2500 nm (%) | Gloss Unit (GU) | Peel Strength (N/25 mm) | | Elongation at break (%) MD/TD | | Tensile Strength (MPa) MD/TD | |
|---|---|---|---|---|---|---|---|---|---|
| | | | | Before being aged by the xenon arc | After being aged by the xenon arc | Before being aged by the xenon arc | After being aged by the xenon arc | Before being aged by the xenon arc | After being aged by the xenon arc |
| Embodiment 1 | 92.6 | 93.3 | 166.0 | 11 | 9 | 60.3/58.4 | 53.2/52.6 | 61.3/59.5 | 53.2/51.4 |
| Embodiment 2 | 91.5 | 93.8 | 167.8 | 12 | 10 | 60.4/59.1 | 52.8/53.1 | 61.7/59.2 | 53.2/51.5 |
| Embodiment 3 | 92.7 | 93.2 | 166.5 | 13 | 11 | 60.6/58.7 | 53.1/54.1 | 61.7/58.7 | 52.7/50.4 |
| Embodiment 4 | 92.5 | 93.3 | 31.3 | 14 | 12 | 59.6/59.3 | 51.9/52.3 | 61.7/59.5 | 53.1/51.2 |
| Embodiment 5 | 92.7 | 93.5 | 166.2 | 17 | 16 | 60.2/58.8 | 54.3/53.8 | 61.6/59.3 | 53.8/51.2 |
| Embodiment 6 | 90.2 | 91.3 | 39.5 | 15 | 14 | 62.1/59.8 | 55.3/52.1 | 65.7/63.7 | 55.9/54.7 |
| Embodiment 7 | 91.0 | 92.4 | 38.1 | 16 | 14 | 63.4/60.6 | 55.9/52.7 | 66.5/64.8 | 57.6/56.7 |
| Embodiment 8 | 89.3 | 92.0 | 33.3 | 19 | 18 | 56.8/54.3 | 50.4/49.4 | 52.4/50.1 | 44.7/42.9 |
| Embodiment 9 | 93.8 | 95.1 | 25.5 | 17 | 16 | 58.9/57.3 | 52.4/51.5 | 54.5/52.1 | 46.5/44.4 |
| Embodiment 10 | 94.2 | 95.4 | 22.7 | 17 | 16 | 64.3/61.2 | 55.9/53.1 | 67.2/65.1 | 58.3/57.4 |
| Comparative Embodiment 1 | 92.2 | 90.5 | 165.7 | 10 | 7 | 41.2/37.2 | 28.7/26.0 | 40.3/37.1 | 28.7/25.5 |
| Comparative Embodiment 2 | 92.5 | 87.4 | 165.4 | 9 | 5 | 30.7/25.9 | 15.6/13.2 | 30.3/26.0 | 15.6/13.4 |
| Comparative Embodiment 3 | 92.1 | 90.3 | 166.0 | 10 | 7 | 41.4/36.5 | 28.5/16.2 | 40.1/37.4 | 28.6/26.3 |
| Comparative Embodiment 4 | 92.8 | 88.2 | 166.2 | 9 | 4 | 30.1/25.7 | 15.5/13.2 | 29.5/26.3 | 15.8/13.6 |

Engineering Application Experiment

Figure 6:
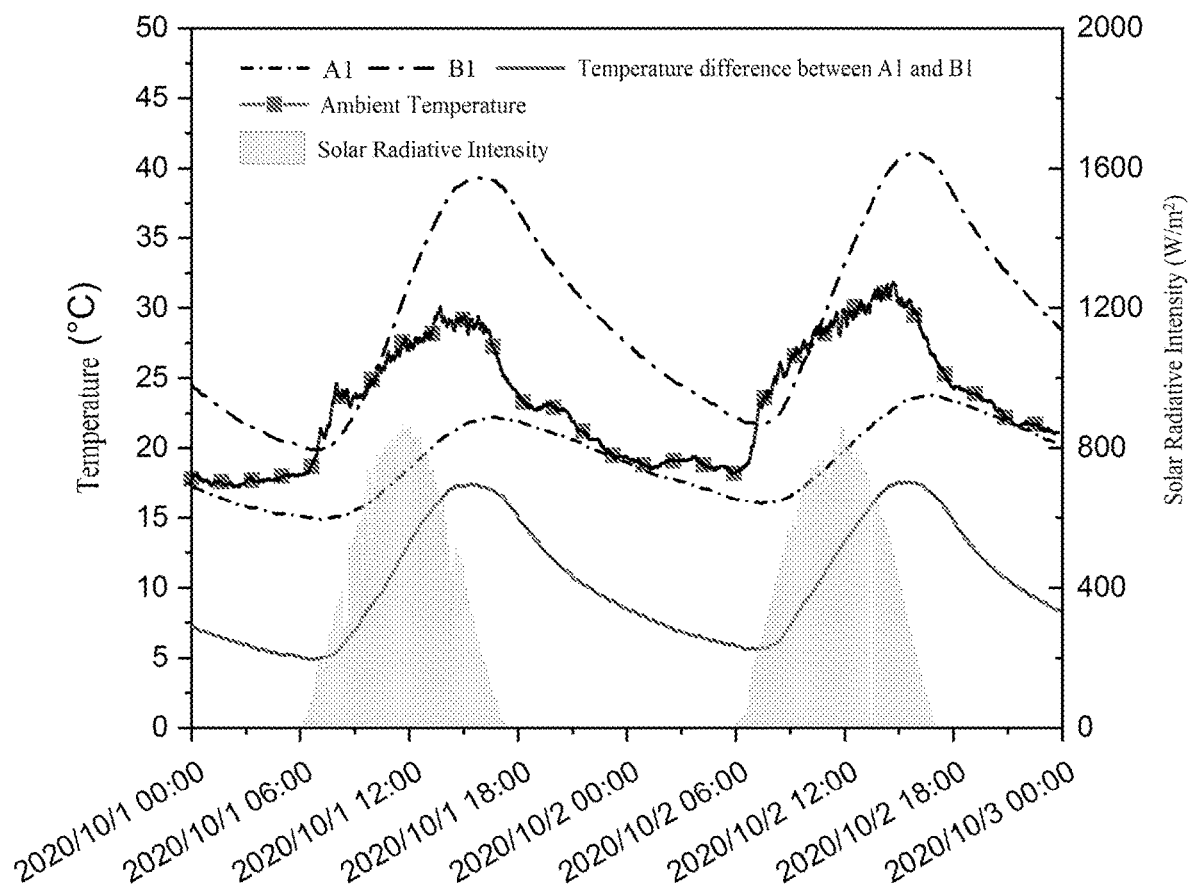
FIG. 6 is a graph showing a cooling effect of an engineering application experiment.

In order to stimulate the cooling effect of the radiative cooling film on a building, two model cabins, model cabin A and model cabin B, located in the same environment Ningbo city can be provided. A surface of the model cabin B can be provided without the radiative cooling film, and a surface of the model cabin A can be provided with the radiative cooling film of embodiment 1. A temperature measuring point A1 and a temperature measuring point B1 can be located at the center inside the model cabin A and the model cabin B, respectively; and an environmental temperature measuring point can be located beside the two model cabins. FIG. 6 shows the temperature curve of the temperatures at the temperature measuring point A1, the temperature measuring B1 and the environmental temperature measuring point from Oct. 1, 2020 to Oct. 3, 2020.

The following conclusions can be obtained from FIG. 6:
(1) the radiative cooling film can effectively reduce the temperature inside the model cabin, and the maximum temperature difference between the temperatures inside the model cabin A and the model cabin B can be 18 degrees centigrade;
(2) every day at noon, the solar radiation intensity can be the largest, and the temperature difference between the two model cabins can be the maximum; and
(3) the radiative cooling film can effectively reduce the temperature of the whole model cabin, and can be environmentally friendly.

The technical features of the above-described embodiments may be in any combination. For the sake of brevity of description, all possible combinations of the technical features in the above embodiments are not described. However, as long as there is no contradiction between the combinations of these technical features, all of the combinations should be considered as within the scope of this disclosure.

Although the devices have been described and illustrated using certain embodiments, however, the disclosure is not limited by the precise details set forth above. Many variations and modifications will be evident to those skilled in the art and may be made without departing from the spirit and scope of the disclosure.

What is claimed is:

1. A radiative cooling film, comprising a carrier layer, a reflective layer and an emissive layer stacked together,
   wherein the emissive layer is defined as a light-incident side of the radiative cooling film, the emissive layer comprises a polymer comprising a C—F bond,
   the carrier layer comprises a polymer comprising at least one of a C—C bond and a C—O bond,
   after being disposed at 120 degrees centigrade for 30 minutes, a transverse direction heat-shrinkage rate of the carrier layer is less than or equal to 2%, and a machine direction heat-shrinkage rate of the carrier layer is less than or equal to 3%, and
   a thickness of the radiative cooling film is in a range of 50 μm to 170 μm, and a ratio of a thickness of the emissive layer to the thickness of the radiative cooling film is in a range of 20:100 to 90:100.

2. The radiative cooling film of claim 1, wherein the reflective layer is disposed between the carrier layer and the emissive layer, the thickness of the radiative cooling film is in a range of 55 μm to 170 μm.

3. The radiative cooling film of claim 2, wherein a ratio of the thickness of the emissive layer to a thickness of the carrier layer is in a range of 1:2 to 8:1.

4. The radiative cooling film of claim 3, wherein the thickness of the emissive layer in in a range of 25 μm to 120 μm.

5. The radiative cooling film of claim 1, wherein the carrier layer is disposed between the reflective layer and the emissive layer, the thickness of the radiative cooling film is in a range of 50 μm to 125 μm.

6. The radiative cooling film of claim 5, wherein the ratio of the thickness of the emissive layer to the thickness of the carrier layer is in a range of 3:10 to 22:3.

7. The radiative cooling film of claim 6, wherein the thickness of the emissive layer is in a range of 15 μm to 110 μm.

8. The radiative cooling film of claim 1, wherein the emissive layer comprises fluorine-containing resin; and/or,
   the carrier layer comprises at least one of polyester, polyurethane, polyamide and polycarbonate; and/or,
   the reflective layer comprises at least one of metal and alloy.

9. The radiative cooling film of claim 1, wherein a surface energy of a surface of the carrier layer contacted with the reflective layer is larger than or equal to 40 mN/m.

10. The radiative cooling film of claim 1, wherein a polymer coating layer is disposed between the carrier layer and the reflective layer, and a surface energy of the polymer coating layer is larger than or equal to 40 mN/m, and a thickness of the polymer coating layer is in a range of 3 nm to 200 nm.

11. The radiative cooling film of claim 10, wherein an absolute value of a difference between a refractivity of the carrier layer and a refractivity of the polymer coating layer is larger than or equal to 0.05.

12. The radiative cooling film of claim 1, wherein a light-incident surface of the emissive layer is provided with an embossing structure.

13. A product comprising the radiative cooling film, wherein the product comprises a substrate and the radiative cooling film of claim 1 disposed on the substrate via an adhesive layer, and the adhesive layer is away from the emissive layer of the radiative cooling film.

14. The product of claim 13, wherein the substrate comprises at least one of a metal substrate, a ceramic substrate, a semi-conductor substrate, a plastic substrate, a glass substrate, a rubber substrate, an asphalt substrate, a cement substrate and a fabric substrate.

15. The product of claim 13, wherein the product is a waterproof radiative cooling roll material, the substrate is a petroleum asphalt paper-based felt, a petroleum asphalt fiberglass-based roll material, an aluminum-surface roll material, a waterproof SBS modified asphalt roll material, a waterproof APP modified asphalt roll material, an ethylene-propylene-diene monomer roll material, a polyvinyl chloride roll material, a chlorinated polyethylene roll material, a mixed rubber roll material, or a waterproof TPO roll material.

16. The product of claim 13, wherein the product is a radiative cooling metal plate, wherein the substrate is an aluminum alloy plate, a galvanized metal plate, a tinned metal plate, a clad steel plate or a colored steel plate.

* * * * *